UNITED STATES PATENT OFFICE.

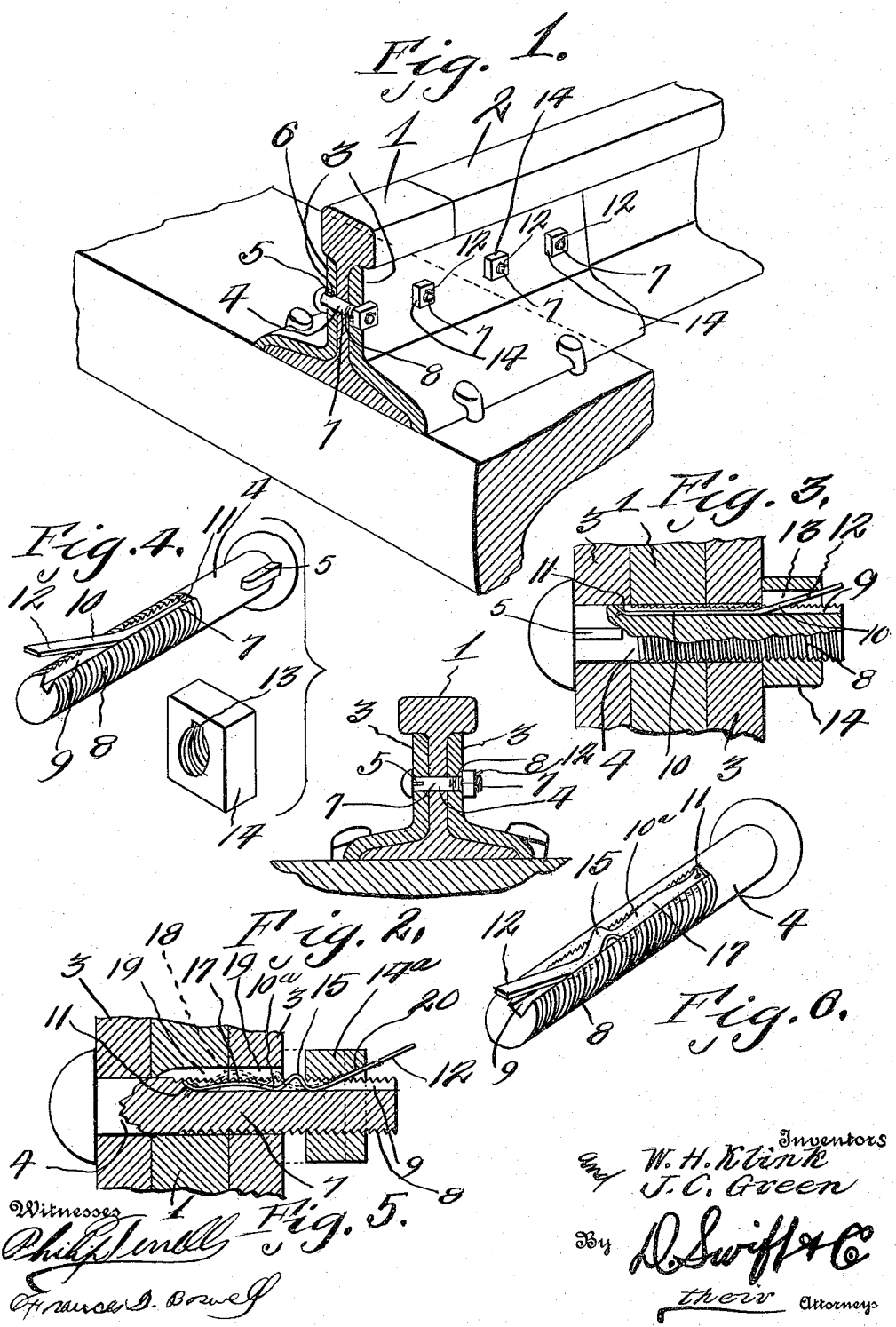

WILLIAM H. KLINK AND JAMES C. GREEN, OF TOWANDA, PENNSYLVANIA.

NUT-LOCK.

1,155,935.  Specification of Letters Patent.  Patented Oct. 5, 1915.

Application filed May 21, 1915. Serial No. 29,509.

*To all whom it may concern:*

Be it known that we, WILLIAM H. KLINK and JAMES C. GREEN, citizens of the United States, residing at Towanda, in the county of Bradford and State of Pennsylvania, have invented a new and useful Nut-Lock; and we do hereby declare the following to be a full, clear, and exact description of the invention, such as will enable others skilled in the art to which it appertains to make and use the same.

This invention relates to an improved nut lock, and an object of the invention is to provide a device of this nature, which is simple, efficient and practical in construction.

Another object of the invention is to provide a resilient device having a portion to engage a slot in the nut adjacent the threaded bore thereof, and another portion adapted to be bowed upwardly by turning the nut home, so as to engage a groove or recess in that which is being clamped, to prevent the bolt from turning.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in perspective, showing two ends of two rails secured together by fish plates with the improved nut lock as applied. Fig. 2 is a sectional view showing the improved nut lock device in elevation. Fig. 3 is an enlarged sectional view through that which is being clamped, showing the bolt broken away and illustrating the resilient device or member for locking the nut. Fig. 4 illustrates collective views of the bolt and nut. Fig. 5 is an enlarged sectional view through that which is clamped and illustrating the bolt partly in section, and showing the resilient device for preventing the bolt from turning, and locking the nut in place. Fig. 6 is a perspective view of the bolt and the resilient device thereon.

Referring to the drawings, 1 and 2 designate two rails, the adjacent ends of which are secured together by the fish plates 3. Passing through the fish plates and the web of the rail is a bolt 4 having a lug 5 to engage a recess 6 of one of the fish plates to prevent the bolt from turning. The shank 7 (which is threaded at 8) of the bolt is provided with an elongated groove 9, in one end of which, one end of a leaf spring locking device 10 is secured at 11. The free end portion 12 of this leaf spring device engages a groove or notch 13 of the nut 14, to prevent the nut from turning, after being screwed home. In applying the nut the portion 12 is held depressed down in the elongated groove 9, until the nut is adjusted home, then the portion 12 is allowed to spring into the groove or recess 13. In Fig. 5, however the leaf spring device 10$^a$ has a permanently upwardly bent portion 15 forming a shoulder, against which the nut 14$^a$ engages, while a portion 12 of the spring device is held down in the elongated groove 9 of the bolt shank. By turning the nut 14$^a$ home, all the time engaging said shoulder or upwardly bent portion 15 causes the part 17 of the spring device to be bowed upwardly as shown in dotted lines at 18, in order to engage the elongated groove or recess 19 in the members which are being clamped, thereby preventing the bolt from turning. After the spring device has been so bowed, the portion 12 of said device is allowed to spring into engagement with the triangular shaped recess 20 adjacent the threaded bore of said nut 14$^a$, thereby preventing the nut from turning. However, by depressing the portion 12 downwardly in the elongated groove 9, the nut may be backed off from the bolt shank.

The invention having been set forth, what is claimed as new and useful is:—

1. In combination, a bolt having an elongated groove in the shank thereof, a leaf spring having one end secured to one end of the groove adjacent the head of the bolt, the leaf spring having a triangular shaped bend constituting a shoulder spaced apart from where it is attached to the groove, a recess in that which is being clamped, a nut threaded on the bolt and adapted to contact with the shoulder as it is screwed home thereby causing that portion of the leaf spring between the shoulder and where it is attached to buckle outwardly into the recess, and means on the nut to be engaged by the free end of the leaf spring to prevent the nut from turning.

2. In combination, a bolt having an elongated groove in the shank thereof, a leaf spring device having one end secured to one end of the groove, said spring leaf device having an upwardly extending portion forming a shoulder, said spring device beyond the shoulder having its free end portion bent angularly, a nut threaded on the bolt and having a triangular shaped notch or recess adjacent the threaded bore and one face of the nut to receive the angularly bent free end portion, a recess in that which is being clamped, a portion of the leaf spring device between its attached end and the shoulder designed to engage the recess of that which is being clamped, when said nut is screwed home and in contact with the shoulder.

In testimony whereof we have signed our names to this specification in the presence of two subscribing witnesses.

WILLIAM H. KLINK.
JAMES C. GREEN.

Witnesses:
WM. F. WARD,
HILA NOBLES WILLIAMS.

Copies of this patent may be obtained for five cents each, by addressing the "Commissioner of Patents, Washington, D. C."